(12) United States Patent
Shimosugi

(10) Patent No.: US 10,719,176 B2
(45) Date of Patent: Jul. 21, 2020

(54) TRANSPARENT LAMINATED FILM FOR PEN INPUT DEVICE AND MANUFACTURING METHOD THEREOF

(71) Applicant: Daicel Corporation, Osaka-shi, Osaka (JP)

(72) Inventor: Shota Shimosugi, Amagasaki (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/111,244

(22) PCT Filed: Feb. 10, 2015

(86) PCT No.: PCT/JP2015/053684
§ 371 (c)(1),
(2) Date: Jul. 13, 2016

(87) PCT Pub. No.: WO2015/151592
PCT Pub. Date: Oct. 8, 2015

(65) Prior Publication Data
US 2016/0328050 A1 Nov. 10, 2016

(30) Foreign Application Priority Data
Mar. 31, 2014 (JP) ................................ 2014-072690

(51) Int. Cl.
| | | |
|---|---|---|
| G06F 3/044 | (2006.01) | |
| G06F 3/045 | (2006.01) | |
| G06F 3/041 | (2006.01) | |
| C08F 290/06 | (2006.01) | |
| C09D 175/16 | (2006.01) | |
| C08J 7/04 | (2020.01) | |
| B05D 1/02 | (2006.01) | |
| B05D 1/18 | (2006.01) | |

(52) U.S. Cl.
CPC ............... *G06F 3/044* (2013.01); *B05D 1/02* (2013.01); *B05D 1/18* (2013.01); *C08F 290/067* (2013.01); *C08J 7/0427* (2020.01); *C09D 175/16* (2013.01); *G06F 3/041* (2013.01); *G06F 3/045* (2013.01); *G06F 3/0412* (2013.01); *C08J 2367/02* (2013.01); *C08J 2475/16* (2013.01); *G06F 2203/04103* (2013.01)

(58) Field of Classification Search
CPC ........ B05D 1/02; B05D 1/18; C08F 290/067; C08J 7/047; C08J 2367/02; C08J 2475/16; C09D 175/16; G06F 3/041; G06F 3/0412; G06F 3/044; G06F 2203/04103
See application file for complete search history.

(56) References Cited

U.S. PATENT DOCUMENTS

| | | | | |
|---|---|---|---|---|
| 2006/0013967 A1* | 1/2006 | Mikoshiba | .......... | G02F 1/13338 428/1.1 |
| 2009/0029151 A1 | 1/2009 | Noguchi et al. | | |
| 2009/0176084 A1* | 7/2009 | Yoshihara | ................ | G02B 1/111 428/313.3 |
| 2009/0297724 A1* | 12/2009 | Weber | ................... | C09D 133/14 427/520 |
| 2013/0274366 A1* | 10/2013 | Jin | ........................... | C09D 4/00 522/96 |

FOREIGN PATENT DOCUMENTS

| | | | |
|---|---|---|---|
| JP | 6-309990 | A | 11/1994 |
| JP | 7-244552 | A | 9/1995 |
| JP | 9-258074 | A | 10/1997 |
| JP | 2001-60144 | A | 3/2001 |
| JP | 2003-296008 | A | 10/2003 |
| JP | 2007-131700 | A | 5/2007 |
| JP | 2007-207091 | A | 8/2007 |
| JP | 2007207091 | A * | 8/2007 |
| JP | 2007-234424 | A | 9/2007 |
| JP | 2010-170515 | A | 8/2010 |
| JP | 2012-66409 | A | 4/2012 |
| JP | 2013-77135 | A | 4/2013 |
| JP | 2014-24332 | A | 2/2014 |
| WO | WO 2012/160894 | A1 | 11/2012 |
| WO | WO 2013/089178 | A1 | 6/2013 |
| WO | WO 2013/191254 | A1 | 12/2013 |

OTHER PUBLICATIONS

English translation from JPlatPat; "Surface Material for Pen Input Device" dated Aug. 16, 2007, author Harada, Eiji et al.*
International Search Report for PCT/JP2015/053684 (PCT/ISA/210) dated Apr. 21, 2015.
Written Opinion of the International Searching Authority for PCT/JP2015/053684 (PCT/ISA/237) dated Apr. 21, 2015.
English translation of International Preliminary Report on Patentability and Written Opinion dated Oct. 13, 2016, in PCT International Application No. PCT/JP2015/053684.

(Continued)

*Primary Examiner* — Frank J Vineis
*Assistant Examiner* — Laura B Figg
(74) *Attorney, Agent, or Firm* — Birch, Stewart, Kolasch & Birch, LLP

(57) ABSTRACT

A transparent laminated film comprising a transparent substrate layer and a surface-smooth layer on one side of the transparent substrate layer is disposed on a display surface of a pen-input device. The surface-smooth layer comprises a cured product of a curable composition containing a urethane (meth)acrylate and a leveling agent, and the coefficient of static friction, the coefficient of dynamic friction, and the difference between the coefficient of static friction and the coefficient of dynamic friction (the coefficient of static friction—the coefficient of dynamic friction) are adjusted to 0.2 to 0.4, 0.1 to 0.3, and a range of larger than 0.05, respectively. The curable composition may further comprise a polyfunctional (meth)acrylate. The leveling agent may comprise a silicone-series leveling agent and/or a fluorine-containing leveling agent. When used for a pen-input device, the film permits input like writing on paper with a ballpoint pen.

4 Claims, No Drawings

(56) References Cited

OTHER PUBLICATIONS

Japanese Office Action and English translation, dated Aug. 15, 2017, for Japanese Application No. 2014-072690.
Extended European Search Report, dated Nov. 3, 2017, for European Application No. 15774241.2.

* cited by examiner

TRANSPARENT LAMINATED FILM FOR PEN INPUT DEVICE AND MANUFACTURING METHOD THEREOF

TECHNICAL FIELD

The present invention relates to transparent laminated films for pen-input devices and processes for producing the films; the transparent laminated films are usable for displays of touch screen displays, pen tablets, or other devices and provide improved writing (or excellent touch) surfaces for pens (digital pens).

BACKGROUND ART

A progress in an electronic display as man machine interface has resulted in popularization of an interactive input system. Among others, an apparatus having a touch screen (a digitizer) and an associated display is widely used in various fields such as an ATM (automated teller machine), a merchandise management, an outworking (canvassing, selling), a guide sign, and an entertainment device. Use of the touch screen in combination with a lightweight and thin display (e.g., a liquid crystal display) dispenses with any keyboard and exhibits the features of the display, and thus such a touch screen display is increasingly used for mobile devices. The touch screen display is a device for inputting (or feeding) information or instructions to a computer by touching a prescribed area on a touch screen (or a touch sensitive panel) with an input means such as a finger or a pen (a digital pen or a stylus). According to the position detection method, the touch screen display can be classified into an optical system, an ultrasonic-wave system, a capacitive system, a resistive system, and other systems. Among these systems, the capacitive system detects the location of the touch using a change in capacitance. In light of excellent functionality, a projected capacitive touch screen display of ITO grid system is now being used for mobile devices and is receiving a lot of attention. The mobile devices include a smartphone, a mobile phone, an electronic paper, a tablet personal computer (PC), a pen tablet (or a graphics tablet), and a game console. Among the capacitive touch screen displays, a pen-input touch screen display which uses a pen as an input means, is also now being widely used and being increasingly applied for a smartphone, an electronic paper, a tablet PC, a pen tablet, a game console, and a PC. The display of the touch screen display is provided with, on a surface thereof, a hardcoat film, an anti-Newton-ring film, a soft film, or other films according to purposes. Nowadays, a pen-input tablet computer (tablet PC) as a pointing device is also in widespread use. The tablet PC and the above-mentioned touch screen display are referred to as a pen-input device. Moreover, the following are also developed: a high-resolution (4K) touch screen television having a pixel dimension (or pixel number) four times as large as that of a full high-definitions television, and a high-resolution pen-input device that is used in the architectural field or the medical field. For these devices, a high transparency is also required.

As pen-input devices are widely used for various purposes, the devices require higher functions for enabling smooth or excellent writing in pen input, e.g., for enabling smooth or excellent writing similar to writing on paper with a ballpoint pen. Unfortunately, a pen-input device provided with the soft film, which has an excessively strong resistance, never enables smooth writing similar to writing on paper with a ballpoint pen.

As a film having an improved writing smoothness, Japanese Patent Application Laid-Open Publication No. 6-309990 (JP-6-309990A, Patent Document 1) discloses a pen-input touch screen that comprises a transparent panel board having a surface pencil hardness of not less than 2H and a coefficient of dynamic friction to an input pen of 0.02 to 0.30. The panel board has an elastic deformation by which the panel board falls into a depth of 20 to 100 µm when contacted with an input pen under a load of 300 g and returns to the original state when the load is removed. According to this document, formation of a transparent adhesive layer having an elastic deformation underlying a surface-treated layer composed of a polysiloxane-series thermosetting hardcoat material improves abrasion resistance to an input pen and smooth writing with the input pen.

For the touch screen, although the transparent adhesive layer gives feeling of dent on pen input, the surface of the touch screen is too smooth and slippery. Thus, the touch screen fails to improve writing smoothness sufficiently.

Meanwhile, there has also been reported a film being smooth to writing touch (smooth in writing) improved by forming an uneven structure on a surface layer (such as a hardcoat layer) of the film. Japanese Patent Application Laid-Open Publication No. 7-244552 (JP-7-244552A, Patent Document 2) discloses a surface material of a pen tablet for a computer. The surface material has a transparent plastic film substrate and an ionization-radiation-curing-type resin layer formed on a surface of the substrate, and the ionization-radiation-curing-type resin layer has a surface having a 10-point average roughness (Rz) of 0.5 to 5.0 µm and an average distance (Sm) between peaks and valleys of 50 to 500 µm.

This surface material has an uneven structure formed by fine particles, and a high-definition display provided with the surface material unfortunately produces sparkling and has a low visibility.

A method for improving smooth writing by controlling a coefficient of friction is also known. Japanese Patent Application Laid-Open Publication No. 2003-296008 (JP-2003-296008A, Patent Document 3) discloses a surface material for a pen-input apparatus, and the surface material consists of a substrate and a surface layer and has a coefficient of dynamic friction of 0.02 to 0.5 and a coefficient of static friction of 0.4 to 1.5 when an input pen is moved on the surface of the surface layer at a load of 200 g and a rate of 10 cm/sec under an atmosphere of 20° C. and 50% relative humidity. This document discloses that the surface layer has a center line average roughness of 0.1 to 5 µm.

The surface material, which offers a large scratchy feeling (scratch in writing) at the beginning of pen-input operation probably due to a high coefficient of static friction of the surface layer, fails to give an excellent writing smoothness.

Japanese Patent Application Laid-Open Publication No. 2013-77135 (JP-2013-77135A, Patent Document 4) discloses a sheet member to be laminated on a touch surface of a touch screen. The sheet member has a surface having a difference (µs–µk) between a coefficient of static friction (µs) and a coefficient of dynamic friction (µk) of not more than 0.05. In working examples of this document, a sheet member having a coefficient of static friction of 0.16 to 0.24 and a coefficient of dynamic friction of 0.16 to 0.24 is prepared. The document also discloses that the sheet member is preferably made of a self-restoring resin. Working examples of the document describes, as a curable composition, a combination of 84 parts by weight of urethane acrylate and 15 parts by weight of a (meth)acrylate-modified polydimethylsiloxane, a combination of 78 parts by weight of urethane acrylate, 12 parts by weight of an active-energy-ray-curable polydimethylsiloxane-series copolymer, and 9 parts by weight of acryloyl morpholine, or other combinations.

Unfortunately, this sheet member has an insufficient writing smoothness. In particular, the sheet member fails to provide smooth writing similar to writing on paper with a ballpoint pen.

CITATION LIST

Patent Literature

Patent Document 1: JP-6-309990A (claim 1, paragraph [0006], and Examples)
Patent Document 2: JP-7-244552A (claim 1)
Patent Document 3: JP-2003-296008A (claims 1 and 5)
Patent Document 4: JP-2013-77135A (claim 1, paragraph [0021], and Examples)

SUMMARY OF INVENTION

Technical Problem

It is therefore an object of the present invention to provide a transparent laminated film for a pen-input device and a process for producing the film; the film enables smooth writing similar to writing on paper with a ballpoint pen.

Another object of the present invention is to provide a transparent laminated film for a pen-input device and a process for producing the film; the film has a low (or reduced) internal haze, a high transparency, and a high (or improved) abrasion resistance.

Solution to Problem

The inventors of the present invention made intensive studies to achieve the above objects and finally found that a transparent laminated film disposed on a display surface of a pen-input device enables smooth writing similar to writing on paper with a ballpoint pen, wherein the film comprises a transparent substrate layer and a surface-smooth layer laminated on one side of the transparent substrate layer, the surface-smooth layer comprises a cured product of a curable composition containing a urethane (meth)acrylate and a leveling agent and has an coefficient of static friction and a coefficient of dynamic friction each adjusted in a specified range. The present invention was accomplished based on the above findings.

That is, the present invention provides a transparent laminated film for being disposed on a display surface of a pen-input device; the transparent laminated film comprises a transparent substrate layer and a surface-smooth layer on one side of the transparent substrate layer; the surface-smooth layer comprises a cured product of a curable composition containing a curable resin and a leveling agent; the curable resin comprises a urethane (meth)acrylate; and the surface-smooth layer has a coefficient of static friction of 0.2 to 0.4, a coefficient of dynamic friction of 0.1 to 0.3, and a difference between the coefficient of static friction and the coefficient of dynamic friction of larger than 0.05, wherein the difference is the coefficient of static friction minus the coefficient of dynamic friction. The curable resin may further comprise a polyfunctional (meth)acrylate. The polyfunctional (meth)acrylate may comprise a difunctional (meth)acrylate having a polycyclic aliphatic skeleton. In the curable composition, the weight ratio of the urethane (meth) acrylate relative to the polyfunctional (meth)acrylate [the urethane (meth)acrylate/the polyfunctional (meth)acrylate] is about 99/1 to 50/50. The leveling agent may comprise a silicone-series leveling agent and/or a fluorine-containing leveling agent. The ratio of the leveling agent is about 0.3 to 10 parts by weight relative to 100 parts by weight of the curable resin. It is preferred that the surface-smooth layer be substantially free from a fine particle. The surface-smooth layer may have a surface having a center line average roughness Ra of less than 0.1 μm. The transparent laminated film of the present invention may have a haze of 0.05 to 5% and a total light transmittance of 80 to 100%.

The present invention also includes a process for producing the transparent laminated film, comprising a step of coating a transparent substrate layer (or a surface of a transparent substrate layer) with a curable composition and a step of curing the curable composition.

Advantageous Effects of Invention

According to the present invention, the transparent laminated film comprises a transparent substrate layer and a surface-smooth layer laminated on one side of the transparent substrate layer, and the surface-smooth layer comprises a cured product of a curable composition containing a urethane (meth)acrylate and a leveling agent and has a coefficient of static friction and a coefficient of dynamic friction each adjusted to a specified range. The film disposed on a display surface of a pen-input device allows smooth writing similar to writing on paper with a ballpoint pen. Moreover, the film, which is substantially free from a fine particle, has a high transparency and is applicable to a high-definition display. In addition, combination of the urethane (meth)acrylate with a polyfunctional (meth)acrylate improves the abrasion resistance of the film.

DESCRIPTION OF EMBODIMENTS

The transparent laminated film (transparent touch film) of the present invention is disposed on a display surface of a pen-input device. The transparent laminated film comprises a transparent substrate layer and a surface-smooth layer laminated on one side of the transparent substrate layer.

[Transparent Substrate Layer]

Transparent substrate layer is composed of a transparent material. The transparent material can be selected according to purposes and may be an inorganic material, such as a glass. In light of strength, formability (moldability), or other characteristics, an organic material may practically be used. The organic material may be a curable resin. From the point of view of formability or other characteristics, a thermoplastic resin is preferred. The thermoplastic resin may include, for example, a polyolefin, a styrenic resin, an acrylic resin, a vinyl chloride-series resin, a poly(vinyl alcohol)-series resin, a polyacetal, a polyester, a polyarylate, a polycarbonate, a polyamide, a polyimide, a polysulfone-series resin, a poly(phenylene ether)-series resin, a poly (phenylene sulfide)-series resin, a fluorocarbon resin, and a cellulose derivative. These thermoplastic resins may be used alone or in combination. A transparent laminated film having a transparent substrate layer composed of a transparent thermoplastic resin is usable for an application that requires transparency, for example, a display of a pen-input device such as a touch screen display.

Among these thermoplastic resins, a preferred resin includes a cyclic polyolefin, a polyester, a poly(methyl methacrylate)-series resin, a bisphenol A-based polycarbonate, a cellulose ester, or other resins. The cellulose ester and the polyester are particularly preferred.

The cellulose ester may include, for example, a cellulose acetate [such as a cellulose triacetate (TAC)] and a cellulose acetate $C_{3-4}$acylate (such as a cellulose acetate propionate or a cellulose acetate butyrate). The polyester may include, for example, a poly(alkylene arylate), such as a poly(ethylene terephthalate) (PET) or a poly(ethylene naphthalate) (PEN).

Among them, in light of well-balanced heat resistance, transparency, and other characteristics, a poly($C_{2-4}$alkylene arylate), such as a PET or a PEN, is preferred. Further, the transparent substrate layer formed from the organic material may be a biaxially stretched film.

The transparent substrate layer composed of the organic material may optionally contain any commonly used additive that does not damage transparency. The additive may include, for example, a curing agent or a crosslinking agent, other resin components, a stabilizer (such as an antioxidant, an ultraviolet absorber, a light stabilizer, or a heat stabilizer), a filler, coloring agent, a nucleation agent, a plasticizer, a flame retardant, a flame-retardant auxiliary, an antistatic agent, a dispersing agent, a surfactant, a wax, and an antibacterial agent. These additives may be used alone or in combination. The proportion of the additive in the transparent substrate layer is, for example, about 0.01 to 10% by weight (in particular, about 0.1 to 5% by weight). The transparent substrate layer may contain a granular (or particulate) filler. From the point of view of reduction of internal haze, the transparent substrate layer is preferably free from a granular filler (or a fine particle). The transparent substrate layer is also preferably free from an additive of a size larger than a light wavelength.

The average thickness of the transparent substrate layer is not limited. In light of easiness to handle or other characteristics, the transparent substrate layer may have an average thickness of not less than 10 μm, for example, about 12 to 500 μm, preferably about 20 to 300 μm, and more preferably about 30 to 200 μm.

[Surface-smooth Layer]

The surface-smooth layer comprises a cured product of a curable composition containing a curable resin (a curable monomer) and a leveling agent. The curable resin comprises a urethane (meth)acrylate.

(Urethane (meth)acrylate)

The urethane (meth)acrylate may be a urethane (meth) acrylate obtainable by allowing a (meth)acrylate having an active hydrogen atom [for example, a hydroxyalkyl (meth) acrylate] to react with a polyisocyanate (or a urethane prepolymer which is formed by a reaction of a polyisocyanate and a polyol and has a free isocyanate group).

Examples of the polyisocyanate may include an aliphatic polyisocyanate, an alicyclic polyisocyanate, an araliphatic polyisocyanate, an aromatic polyisocyanate, and a polyisocyanate derivative.

The aliphatic polyisocyanate may include, for example, a $C_{2-16}$alkane diisocyanate such as tetramethylene diisocyanate, hexamethylene diisocyanate (HDI), or trimethylhexamethylene diisocyanate. The alicyclic polyisocyanate may include, for example, 1,4-cyclohexane diisocyanate, isophorone diisocyanate (IPDI), 4,4'-methylenebis(cyclohexyl isocyanate), hydrogenated xylylene diisocyanate, and norbornane diisocyanate. The araliphatic polyisocyanate may include, for example, xylylene diisocyanate (XDI) and tetramethylxylylene diisocyanate. The aromatic polyisocyanate may include, for example, phenylene diisocyanate, 1,5-naphthylene diisocyanate (NDI), diphenylmethane diisocyanate (MDI), tolylene diisocyanate (TDI), 4,4'-toluidine diisocyanate, and 4,4'-diphenyl ether diisocyanate. The polyisocyanate derivative may include, for example, a multimer (such as a dimer or a trimer), biuret, an allophanate, a carbodiimide, and a uretdione. These polyisocyanates may be used alone or in combination.

Among these polyisocyanates, in light of heat resistance, durability, or other characteristics, a preferred one includes a non-yellowing-type diisocyanate or a derivative thereof, for example, a non-yellowing diisocyanate or a derivative thereof, such as an aliphatic diisocyanate (e.g., HDI) or an alicyclic diisocyanate (e.g., IPDI and hydrogenated XDI), in particular, a trimer of an aliphatic diisocyanate (e.g., a trimer having an isocyanurate ring). These polyisocyanates may be used alone or in combination.

As the polyol, a polymer polyol is practically used. The polymer polyol may include a polymer polyol such as a polyester polyol, a polyether polyol, a polyetherester polyol, or a polycarbonate polyol.

The polyester polyol may be, for example, a reaction product of a polycarboxylic acid (or an anhydride thereof) and a polyol, or may be a reaction product obtainable by ring-opening addition polymerization of a lactone to an initiator.

As the polycarboxylic acid, there may be mentioned a dicarboxylic acid [for example, an aromatic dicarboxylic acid or an anhydride thereof (such as terephthalic acid, isophthalic acid, or phthalic anhydride), an alicyclic dicarboxylic acid or an anhydride thereof (such as tetrahydrophthalic anhydride, or het anhydride), and an aliphatic dicarboxylic acid or an anhydride thereof (a $C_{4-20}$alkanedicarboxylic acid such as succinic acid (anhydride), adipic acid, or sebacic acid)], or an alkyl ester of such a dicarboxylic acid. Among these polycarboxylic acids, an aliphatic dicarboxylic acid or an anhydride thereof (e.g., a $C_{6-20}$alkanedicarboxylic acid such as adipic acid, azelaic acid, or sebacic acid) is preferred. These polycarboxylic acids may be used alone or in combination.

The polyol may include a diol, for example, an aliphatic diol [e.g., an alkanediol (a $C_{2-22}$alkanediol, such as ethylene glycol, propylene glycol, trimethylene glycol, 1,4-butanediol, 1,5-pentanediol, neopentyl glycol, or 1,6-hexanediol)], an alicyclic diol [e.g., a cycloalkanediol (such as 1,4-cyclohexanediol or 1,4-cyclohexane dimethanol), a hydrogenated bisphenol (such as hydrogenated bisphenol A), or a $C_{2-4}$alkylene oxide adduct thereof], and an aromatic diol [e.g., an araliphatic diol (such as xylylene glycol), a bisphenol (such as bisphenol A, bisphenol S, or bisphenol F), or an $C_{2-4}$alkylene oxide adduct thereof]. These polyols may be used alone or in combination. Among these polyols, from the point of view of stability or other characteristics, an aliphatic diol and an alicyclic diol are preferred.

The lactone may include, for example, a $C_{3-10}$lactone such as butyrolactone, valerolactone, caprolactone, or enantholactone. These lactones may be used alone or in combination. Among these lactones, a $C_{4-8}$lactone such as valerolactone or caprolactone is preferred.

Examples of the initiator to the lactone may include water, a homopolymer or copolymer of an oxirane compound (for example, a poly(ethylene glycol) and a poly(tetramethyleneether glycol)), a low molecular weight polyol (e.g., an alkanediol such as ethylene glycol, trimethylolpropane, glycerin, pentaerythritol, and bisphenol A), and a compound having an amino group (for example, a diamine compound such as ethylenediamine, hexamethylenediamine, hydrazine, xylylenediamine, or isophoronediamine). These initiators may be used alone or in combination.

The polyether polyol may include, for example, a ring-opening polymerization product or copolymer of the oxirane compound [for example, a poly($C_{2-4}$alkylene glycol), such as a polyethylene glycol), a poly (propylene glycol), a poly (trimethyleneether glycol), or a poly(tetramethyleneether glycol)] and an adduct of bisphenol A or hydrogenated bisphenol A with an alkylene oxide. These polyether polyols may be used alone or in combination.

The polyetherester polyol may include, for example, a polyetherester polyol which is a polymer of the dicarboxylic acid (such as an alicyclic dicarboxylic acid or an aliphatic dicarboxylic acid) or the dialkyl ester thereof and the polyether polyol.

The polycarbonate polyol may include, for example, a polymer of a glycol and a carbonate or phosgene. The glycol may include one or more glycols selected from the group consisting of an alkanediol (e.g., ethylene glycol and 1,4-butanediol), a (poly)oxyalkylene glycol (e.g., diethylene glycol), an alicyclic diol (e.g., 1,4-cyclohexanediol, 1,4-cyclohexane dimethanol, and hydrogenated bisphenol A), and an aromatic diol [e.g., a bisphenol (such as bisphenol A) or an adduct of a bisphenol with an alkylene oxide]. The carbonate may include dimethyl carbonate, ethylene carbonate, and diphenyl carbonate.

Among these polymer polyols, the polyester polyol, the polyether polyol, and the polycarbonate polyol are widely used. In light of excellent durability, and softness, the polyester polyol and the polyether polyol are particularly preferred.

The urethane prepolymer may include, for example, a multimer of the polyisocyanate, a biuret-modified multimer of the polyisocyanate, an adduct of the polyisocyanate and the polyol, and a polyurethane prepolymer obtainable by allowing the polyol to react with an excessive amount of the polyisocyanate. These prepolymers may be used alone or in combination.

A preferred urethane prepolymer may include, for example, a multimer (such as a trimer, a pentamer, or a heptamer) of the polyisocyanate, a biuret multimer (biuret-modified product) of the polyisocyanate, an adduct of the polyisocyanate and the polyol (a triol such as glycerin or trimethylolpropane), a polyurethane prepolymer of the diisocyanate and the polyester polyol, and a polyurethane prepolymer of the diisocyanate and the polyether polyol, in particular, a polyurethane prepolymer of the diisocyanate and the polyether polyol or the polyester polyol.

The (meth)acrylate having an active hydrogen atom may include, for example, a hydroxy$C_{2-6}$alkyl (meth)acrylate such as 2-hydroxyethyl (meth)acrylate or 2-hydroxypropyl (meth)acrylate; a hydroxyalkoxy$C_{2-6}$alkyl (meth)acrylate such as 2-hydroxy-3-methoxypropyl (meth)acrylate; pentaerythritol tri(meth)acrylate; and a dipentaerythritol poly(meth)acrylate.

The number of (meth)acryloyl groups per molecule of the urethane (meth)acrylate is not less than 2. From the point of view of mechanical strength or other characteristics, the number of (meth)acryloyl groups is, for example, about 2 to 8, preferably about 2 to 6, and more preferably about 2 to 4 (particularly, about 3 to 4).

In particular, from the point of view of excellent stability (such as weatherability) and softness, the urethane (meth)acrylate may preferably include an aliphatic urethane (meth)acrylate, and an alicyclic urethane (meth)acrylate, or others. For example, the urethane (meth)acrylate may be a polyester-based urethane (meth)acrylate obtainable from an aliphatic diisocyanate.

The urethane (meth)acrylate is produced by combining a polyisocyanate and a (meth)acrylate having an active hydrogen atom, usually, at a ratio in which the isocyanate group and the active hydrogen atom are substantially equivalent (isocyanate group/active hydrogen atom is about 0.8/1 to 1.2/1). Processes for producing these urethane (meth)acrylates may be referred to Japanese Patent Application Laid-Open Publication No. 2008-74891, or other references. The tri- or more-functional (polyfunctional) urethane (meth)acrylate may be a urethane (meth)acrylate obtainable from a polyol such as trimethylolpropane, pentaerythritol, or dipentaerythritol.

The weight-average molecular weight of the urethane (meth)acrylate is not limited. In light of improvement in writing touch (writing smoothness), the urethane (meth)acrylate may have a weight-average molecular weight of not less than 500, for example, about 500 to 10000, preferably about 600 to 9000, and more preferably about 700 to 8000 (particularly about 1000 to 5000) in terms of polystyrene in gel permeation chromatography (GPC). A urethane (meth)acrylate having an excessively low molecular weight makes the writing touch of the surface-smooth layer poor. A urethane (meth)acrylate having an excessively high molecular weight is hard to handle and makes it difficult to form the surface-smooth layer.

(Polyfunctional (meth)acrylate)

In order to improve the abrasion resistance without reducing comfortable writing, the curable composition may contain a polyfunctional (meth)acrylate [a urethane-bond-free polyfunctional (meth)acrylate] as a curable resin.

The polyfunctional (meth)acrylate has a plurality of (meth)acryloyl groups and is divided broadly into a difunctional (meth)acrylate and a tri- or more-functional (polyfunctional) (meth)acrylate.

The difunctional (meth)acrylate may include, for example, an $C_{2-10}$alkanediol di(meth)acrylate, such as ethylene glycol di(meth)acrylate, propylene glycol di(meth)acrylate, 1,3-propanediol di(meth)acrylate, 1,4-butanediol di(meth)acrylate, neopentyl glycol di(meth)acrylate, or 1,6-hexanediol di(meth)acrylate; a polyalkylene glycol di(meth)acrylate, such as diethylene glycol di(meth)acrylate, triethylene glycol di (meth)acrylate, a polyethylene glycol di(meth)acrylate, dipropylene glycol di(meth)acrylate, or a polypropylene glycol di(meth)acrylate; an alkanepolyol di(meth)acrylate, such as glycerin di(meth)acrylate; a di(meth)acrylate of an adduct of a bisphenol (such as bisphenol A, S) with an $C_{2-4}$alkylene oxide, such as 2,2-bis(4-(meth)acryloyloxyethoxyphenyl)propane, 2,2-bis(4-(meth)acryloyloxydiethoxyphenyl)propane, or 2,2-bis(4-(meth)acryloyloxypolyethoxyphenyl)propane; a di(meth)acrylate of an acid-modified alkanepolyol such as a pentaerythritol modified with a fatty acid; and a crosslinked cyclic di(meth)acrylate, such as tricyclo[$5.2.1.0^{2,6}$]decanedimethanol di(meth)acrylate.

The tri- or more-functional (polyfunctional) (meth)acrylate may include an esterification product of a polyhydric alcohol and (meth)acrylic acid, e.g., a trifunctional (meth)acrylate, such as glycerin tri(meth)acrylate, trimethylolethane tri(meth)acrylate, trimethylolpropane tri(meth)acrylate, pentaerythritol tri(meth)acrylate, or tris(2-hydroxyethyl)isocyanurate tri(meth)acrylate; a tetrafunctional (meth)acrylate, such as ditrimethylolpropane tetra(meth)acrylate or pentaerythritol tetra(meth)acrylate; a pentafunctional (meth)acrylate, such as dipentaerythritol penta(meth)acrylate; and a hexafunctional (meth)acrylate, such as dipentaerythritol hexa(meth)acrylate. In these polyfunctional (meth)acrylates, the polyhydric alcohol may be an adduct of an alkylene oxide (for example, a $C_{2-4}$alkylene oxide, such as ethylene oxide or propylene oxide). The average mole number of the alkylene oxides added can for example be selected from about 0 to 30 mol (in particular, about 1 to 10 mol).

These polyfunctional (meth)acrylates may be used alone or in combination. Among these polyfunctional (meth)acrylates, a ring-containing difunctional (meth)acrylate is preferred in light of improvement in abrasion resistance, easy adjustment of coefficient of friction to an appropriate range, and easy achievement of smooth writing similar to writing on paper with a ballpoint pen.

The ring-containing difunctional (meth)acrylate has an aliphatic ring and/or an aromatic ring in a molecule thereof. For example, the ring-containing difunctional (meth)acrylate may include a $C_{6-20}$ (in particular, $C_{8-12}$) crosslinked bi- to tetra-cyclic di(meth)acrylate such as tricyclodecanedimethanol di(meth)acrylate or adamantane di (meth)acrylate; a di (meth)acrylate of a bisphenol (such as bisphenol A, S)-$C_{2-4}$alkylene oxide adduct [having an average mole number of alkylene oxides added of about 0 to 30 mol (particularly about 1 to 10 mol)] such as 2,2-bis(4-(meth)acryloyloxyethoxyphenyl)propane, 2,2-bis(4-(meth)acryloyloxypropoxyphenyl)propane, 2,2-bis(4-(meth)acryloyloxydiethoxyphenyl)propane, or 2,2-bis(4-(meth)acryloyloxypolyethoxyphenyl)propane; and an oligomer [e.g., an aromatic epoxy(meth)acrylate such as a bisphenol A-based epoxy (meth)acrylate or a novolac epoxy(meth)acrylate].

In light of high compatibility of strength with writing smoothness, a preferred ring-containing difunctional (meth) acrylate may include a di (meth)acrylate having a polycyclic alicyclic skeleton, in particular, a di(meth)acrylate having a $C_{8-12}$ crosslinked bi- to tetra-cyclic alicyclic skeleton such as tricyclodecanedimethanol di(meth)acrylate.

The weight ratio of the urethane (meth)acrylate and the polyfunctional (meth)acrylate [the urethane (meth)acrylate/ the polyfunctional (meth)acrylate] can be selected from the range of about 99/1 to 50/50, for example, is about 98/2 to 60/40, preferably about 97/3 to 70/30, and more preferably about 95/5 to 80/20 (particularly about 93/7 to 85/15). Too small a ratio of the polyfunctional (meth)acrylate is ineffective in improving the surface-smooth layer. Too large a ratio of the polyfunctional (meth)acrylate reduces writing smoothness.

The curable resin may further contain other curable resins, for example, a monofunctional (meth)acrylate [e.g., (meth) acrylic acid; an alkyl (meth)acrylate such as methyl (meth) acrylate; a cycloalkyl (meth)acrylate such as cyclohexyl (meth)acrylate; and a crosslinked cyclic (meth)acrylate such as dicyclopentanyl (meth)acrylate, dicyclopentenyl (meth) acrylate, dicyclopentenyloxyethyl (meth)acrylate, bornyl (meth)acrylate, isobornyl (meth)acrylate, or tricyclodecanyl (meth)acrylate] and other vinyl-series compounds [such as styrene or vinylpyrrolidone]. The ratio of other curable resins relative to 100 parts by weight of the urethane (meth)acrylate is not more than 50 parts by weight, for example, about 0.1 to 30 parts by weight (particularly about 1 to 10 parts by weight).

(Leveling Agent)

As the leveling agent, there may be used a commonly used leveling agent (e.g., an ethylene oxide adduct of acetylene glycol) as far as the leveling agent has a capability to reduce a surface tension. In light of an excellent capability to reduce a surface tension, the leveling agent may preferably include a silicone-series leveling agent and a fluorine-containing leveling agent. According to the present invention, the combination use of the resin component and the leveling agent improves the surface smoothness and allows the adjustment to the coefficient of friction for smooth or excellent writing. Not only does the use of a specific leveling agent allow the maintenance of the hardness or abrasion resistance, but the control of the blending ratio also allows the improvement of the hardness or abrasion resistance.

The silicone-series leveling agent includes a leveling agent having a polyorganosiloxane skeleton. As the polyorganosiloxane skeleton, there may be used a polyorganosiloxane having a monofunctional M unit (a unit generally represented by $R_3SiO_{1/2}$), a difunctional D unit (a unit generally represented by $R_2SiO_{2/2}$), a trifunctional T unit (a unit generally represented by $RSiO_{3/2}$), and/or a tetrafunctional Q unit (a unit generally represented by $SiO_{4/2}$). Practically, a polyorganosiloxane having the D unit is used. The polyorganosiloxane may have an organic group (R) selected from hydrocarbon groups such as an alkyl group, an alkenyl group, a cycloalkyl group, a cycloalkenyl group, an aryl group, and an aralkyl group. The organic group R usually includes a $C_{1-4}$alkyl group and/or an aryl group, preferably methyl group and/or phenyl group (in particular, methyl group). The repeating number of siloxane units (the degree of polymerization) is, for example, about 2 to 3000, preferably about 3 to 2000, and preferably about 5 to 1000.

The fluorine-containing leveling agent includes a leveling agent having a fluoroaliphatic hydrocarbon skeleton. As the fluoroaliphatic hydrocarbon skeleton, for example, there may be mentioned a fluoro$C_{1-10}$alkane, such as fluoromethane, fluoroethane, fluoropropane, fluoroisopropane, fluorobutane, fluoroisobutane, fluoro-t-butane, fluoropentane, or fluorohexane.

Each one of these fluoroaliphatic hydrocarbon skeletons has one or more fluorine atoms substituted in place of one or more hydrogen atoms on the parent skeleton. In order to improve the abrasion resistance, the sliding property, and the antifouling property, a perfluoroaliphatic hydrocarbon skeleton in which all hydrogen atoms on the parent skeleton are replaced with fluorine atoms is preferred.

The fluoroaliphatic hydrocarbon skeleton may have a polyfluoroalkylene ether skeleton, which is a repeating unit through an ether bond. The fluoroaliphatic hydrocarbon group as the repeating unit may be at least one member selected from the group consisting of fluoro$C_{1-4}$alkylene groups, for example, fluoromethylene, fluoroethylene, fluoropropylene, and fluoroisopropylene. These fluoroaliphatic hydrocarbon groups may be the same or different from each other. The repeating number of fluoroalkylene ether units (the degree of polymerization) may be, for example, about 10 to 3000, preferably about 30 to 1000, and more preferably about 50 to 500.

Among these skeletons, the polyorganosiloxane skeleton is preferred in light of easy control of coefficient of friction and easy achievement of smooth writing similar to writing on paper with a ballpoint pen.

In order to impart various functions to the cationic curable silicone resin, the leveling agent having such a skeleton may have a hydrolytically condensable group, a polar group, a radical-polymerizable group, a polyether group, a polyester group, a polyurethane group, or other groups. The silicone-series leveling agent may have a fluoroaliphatic hydrocarbon group, or the fluorine-containing leveling agent may have a polyorganosiloxane group.

The hydrolysable group may include, for example, hydroxysilyl group; a trihalosilyl group (such as trichlorosilyl); a dihalo$C_{1-4}$alkylsilyl group (such as dichloromethylsilyl); a dihaloaryl group (such as dichlorophenylsilyl); a halodiC$_{1-4}$alkylsilyl group (such as chlorodimethylsilyl); a triC$_{1-4}$alkoxysilyl group (such as trimethoxysilyl or triethoxysilyl); a diC$_{1-4}$alkoxyC$_{1-4}$alkylsilyl group (such as dimethoxymethylsilyl or diethoxymethylsilyl); a diC$_{1-4}$alkoxyarylsilyl group (such as dimethoxyphenylsilyl or diethoxyphenylsilyl); a C$_{1-4}$alkoxydiC$_{1-4}$alkylsilyl group (such as methoxydimethylsilyl or ethoxydimethylsilyl); a C$_{1-4}$alkoxydiarylsilyl group (such as methoxydiphenylsilyl or ethoxydiphenylsilyl); and a C$_{1-4}$alkoxyC$_{l-4}$alkylarylsilyl group (such as methoxymethylphenylsilyl or ethoxymethylphenylsilyl).

The polar group may include, for example, a hydroxyl group, an amino group, a carboxyl group, an acid anhydride group (such as maleic anhydride group), and an isocyanate group.

The radical-polymerizable group may include, for example, a (meth)acryloyloxy group and a vinyl group.

As the polyether group, for example, there may be mentioned a polyoxyC$_{2-4}$alkylene group, such as a polyoxyethylene group, a polyoxypropylene group, a polyoxybutylene group, or a polyoxyethylene-polyoxypropylene group. In the polyether group, the repeating number of oxyalkylene groups (the mole number of oxyalkylene groups added) is, for example, about 2 to 1000, preferably about 3 to 100, and preferably about 5 to 50.

The polyester group may include, for example, a polyester group obtainable by a reaction of a dicarboxylic acid [e.g., an aromatic carboxylic acid (such as terephthalic acid) or an aliphatic carboxylic acid (such as adipic acid)] and a diol (e.g., an aliphatic diol, such as ethylene glycol) and a polyester group obtainable by a ring opening polymerization of a circular ester (e.g., a lactone, such as caprolactone).

The polyurethane group may include, for example, a commonly used polyester-based polyurethane group and a polyether-based polyurethane group.

Each one of these functional groups may be introduced into the polyorganosiloxane skeleton or the fluoroaliphatic hydrocarbon skeleton by a direct bonding or through a linkage group (for example, an alkylene group, a cycloalkylene group, an ether group, an ester group, an amide group, a urethane group, or a linkage group having a plurality of the above-mentioned groups).

Among these functional groups, a preferred one includes a polyether group in respect of an excellent capability to reduce a surface tension, and a polymerizable group in respect that the group is allowed to react with the resin component to improve the hardness of the surface-smooth layer.

As the silicone-series leveling agent, there may be used a commercially available silicone-series leveling agent. The commercially available silicone-series leveling agent may include, for example, a EBECRYL series leveling agent manufactured by Daicel-Allnex Ltd. (e.g., "EBECRYL1360"), a BYK series leveling agent manufactured by BYK Japan KK (e.g., "BYK-300", "BYK-301/302", "BYK-306", "BYK-307", "BYK-310", "BYK-315", "BYK-313", "BYK-320", "BYK-322", "BYK-323", "BYK-325", "BYK-330", "BYK-331", "BYK-333", "BYK-337", "BYK-341", "BYK-344", "BYK-345/346", "BYK-347", "BYK-348", "BYK-349", "BYK-370", "BYK-375", "BYK-377", "BYK-378", "BYK-UV3500", "BYK-UV3510", "BYK-UV3570", "BYK-3550", "BYK-SILCLEAN3700", and "BYK-SILCLEAN3720"), an AC series leveling agent manufactured by Algin Chemie (e.g., "AC FS180", "AC FS360", and "AC S20"), a POLYFLOW series leveling agent manufactured by Kyoeisha Chemical Co., Ltd. (e.g., "POLYFLOW KL-400X", "POLYFLOW KL-400HF", "POLYFLOW KL-401", "POLYFLOW KL-402", "POLYFLOW KL-403", and "POLYFLOW KL-404"), a KP series leveling agent manufactured by Shin-Etsu Chemical Co., Ltd. (e.g., "KP-323", "KP-326", "KP-341", "KP-104", "KP-110", and "KP-112"), and a leveling agent manufactured by Dow Corning Toray Co., Ltd. (e.g., "LP-7001", "LP-7002", "8032ADDITIVE", "57ADDITIVE", "L-7604", "FZ-2110", "FZ-2105", "67ADDITIVE", "8618ADDITIVE", "3ADDITIVE", and "56ADDITIVE").

As the fluorine-containing leveling agent, there may be used a commercially available fluorine-containing leveling agent. The commercially available fluorine-containing leveling agent may include, for example, an OPTOOL series leveling agent manufactured by Daikin Industries, Ltd. ("DSX", "DAC-HP"), a SURFLON series leveling agent manufactured by AGC Seimi Chemical Co., Ltd. (e.g., "S-242", "S-243", "S-420", "S-611", "S-651", and "S-386"), a BYK series leveling agent manufactured by BYK Japan KK (e.g., "BYK-340"), an AC series leveling agent manufactured by Algin Chemie (e.g., "AC 110a" and "AC 100a"), a MEGAFACE series leveling agent manufactured by DIC Corporation (e.g., "MEGAFACE F-114", "MEGAFACE F-410", "MEGAFACE F-444", "MEGAFACE EXP TP-2066", "MEGAFACE F-430", "MEGAFACE F-472SF", "MEGAFACE F-477", "MEGAFACE F-552", "MEGAFACE F-553", "MEGAFACE F-554", "MEGAFACE F-555", "MEGAFACE F-556", "MEGAFACE R-94", "MEGAFACE RS-72-K", "MEGAFACE RS-75", "MEGAFACE F-556", "MEGAFACE EXP TF-1367", "MEGAFACE EXP TF-1437", "MEGAFACE F-558", and "MEGAFACE EXP TF-1537", a FC series leveling agent manufactured by Sumitomo 3M Limited (e.g., "FC-4430" and "FC-4432"), a FTERGENT series leveling agent manufactured by Neos Company Limited (e.g., "FTERGENT 100", "FTERGENT 100C", "FTERGENT 110", "FTERGENT 150", "FTERGENT 150CH", "FTERGENT A-K", "FTERGENT 501", "FTERGENT 250", "FTERGENT 251", "FTERGENT 222F", "FTERGENT 208G", "FTERGENT 300", "FTERGENT 310", and "FTERGENT 400SW"), and a PF series leveling agent manufactured by Kitamura Chemicals Co., Ltd. (e.g., "PF-136A", "PF-156A", "PF-151N", "PF-636", "PF-6320", "PF-656", "PF-6520", "PF-651", "PF-652", and "PF-3320").

These leveling agents may be used alone or in combination. A preferred leveling agent may include a silicone-series leveling agent having a (poly) oxyC$_{2-3}$alkylene group, such as a (poly)oxyethylene group, on a main chain or a side chain of a polyorganosiloxane skeleton thereof (e.g., a polydimethylsiloxanepolyoxyethylene); a silicone-series leveling agent having a (meth)acryloyloxy group on a main chain end or a side chain of a polyorganosiloxane skeleton thereof [e.g., a silicone-modified (meth)acrylic resin having a polyorganosiloxane on a (meth)acrylic resin]; and a fluorine-containing leveling agent having a fluoroaliphatic hydrocarbon group on a side chain of a (poly)oxyC$_{2-3}$alkylene skeleton, such as (poly)oxyethylene, thereof (e.g., a fluoroalkylpolyoxyethylene).

The ratio of the leveling agent relative to 100 parts by weight of the curable resin can be selected from the range of about 0.2 to 20 parts by weight, and, for example, is about 0.3 to 10 parts by weight, preferably about 0.5 to 5 parts by weight, and more preferably about 0.7 to 3 parts by weight (particularly about 1 to 2 parts by weight). The leveling agent in an excessively small ratio may decrease the surface smoothness and the writing smoothness. The leveling agent in an excessively large ratio may decrease the abrasion resistance and the writing smoothness.

(Characteristics of Surface-smooth Layer)

The transparent laminated film of the present invention, which has the surface-smooth layer having a surface with a coefficient of friction adjusted to a specified range, can provide smooth writing similar to writing on paper with a ballpoint pen.

Specifically, the surface-smooth layer has a coefficient of static friction ($\mu s$) of 0.2 to 0.4, for example, about 0.23 to 0.38, preferably about 0.25 to 0.36 (e.g., about 0.27 to 0.35), and more preferably about 0.28 to 0.34 (particularly about 0.29 to 0.32). A surface-smooth layer having too small a coefficient of static friction is excessively slippery and provides uncomfortable writing. A surface-smooth layer having too large a coefficient of static friction offers a large scratchy feeling at the beginning of pen-input operation and provides uncomfortable writing. Thus, a surface-smooth layer having a coefficient of static friction either smaller or larger than this range fails to achieve smooth writing similar to writing on paper with a ballpoint pen.

The surface-smooth layer has a coefficient of dynamic friction ($\mu k$) of 0.1 to 0.3, for example, about 0.12 to 0.28, preferably about 0.13 to 0.25, and more preferably about 0.14 to 0.23 (particularly about 0.15 to 0.21). A surface-smooth layer having too small a coefficient of dynamic friction is excessively slippery and provides uncomfortable writing. A surface-smooth layer having too large a coefficient of dynamic friction offers a large scratchy feeling and provides uncomfortable writing. Thus, in either case, such a surface-smooth layer fails to achieve smooth writing similar to writing on paper with a ballpoint pen.

It is necessary that there be a difference ($\mu s - \mu k$) of more than 0.05 between the coefficient of static friction and the coefficient of dynamic friction. For example, the difference is about 0.06 to 0.5, preferably about 0.07 to 0.4, and more preferably about 0.08 to 0.3 (particularly about 0.09 to 0.2). A surface-smooth layer having the difference ($\mu s - \mu k$) of not more than 0.05 is excessively slippery at the beginning of pen-input operation and fails to achieve smooth writing similar to writing on paper with a ballpoint pen.

In the present invention, the coefficient of friction can be measured using a static and dynamic friction tester. Specifically, the coefficient of friction can be measured according to the method described in the after-mentioned Examples.

The surface of the surface-smooth layer is smooth and may have a center line average roughness Ra of less than 0.1 µm. For example, the center line average roughness Ra is about 0.1 to 10 nm, preferably about 0.3 to 8 nm, and more preferably about 0.5 to 5 nm. A surface-smooth layer having too large a surface roughness has a low surface smoothness, and thus the surface-smooth layer has reduced writing smoothness and reduced optical characteristics. According to the present invention, the center line average roughness Ra can be measured using a non-contact surface cross-sectional texture measuring system ("R3300GL-Lite-AC" manufactured by Ryoka Systems Inc.).

The surface-smooth layer (in particular, a surface-smooth layer composed of a cured product of a curable composition containing a polyfunctional (meth)acrylate) has a high abrasion resistance. Even in a case where a #0000 steel wool with which a stick 1 cm in diameter is covered is allowed to go back and forth on the surface of the surface-smooth layer 10 times under a load of 100 g/cm$^2$, scratches do not result on the surface of the surface-smooth layer.

The surface-smooth layer may further contain a polymerization initiator. The polymerization initiator may be a thermal polymerization initiator [a thermal radical generator, such as a peroxide (e.g., benzoyl peroxide)] or may be a photopolymerization initiator (a photo radical generator). A preferred polymerization initiator includes a photopolymerization initiator. The photopolymerization initiator may include, for example, an acetophenone compound or propiophenone compound, a benzil compound, a benzoin compound, a benzophenone compound, a thioxanthone compound, and an acylphosphine oxide compound. The photopolymerization initiator may contain a commonly used photosensitizer or photopolymerization accelerator (for example, a tertiary amine). The ratio of the photopolymerization initiator relative to 100 parts by weight of the curable resin may be about 0.1 to 30 parts by weight, preferably about 1 to 20 parts by weight, and more preferably about 2 to 15 parts by weight (particularly about 3 to 10 parts by weight).

The curable composition may be a thermosetting composition or may be a photo-curable compound that can harden in a short time, for example, an ultraviolet-curable compound and an EB-curable compound. In particular, a practically usable composition includes an ultraviolet-curable resin.

The surface-smooth layer may optionally contain the commonly used additive as exemplified in the paragraph of transparent substrate layer as far as the layer does not decrease in transparency due to the additive. The additives may be used alone or in combination. The ratio of the additive relative to 100 parts by weight of the curable resin is about 0.01 to 10 parts by weight (particularly about 0.1 to 5 parts by weight). The curable composition may contain a fine particle (a granular filler). In light of reduction of internal haze and external haze, it is preferred that the curable composition be substantially free from a fine particle (it is particularly preferred that the curable composition contain no fine particles). It is preferred that the curable composition be free from an additive of a size larger than light wavelength.

The surface-smooth layer may have an average thickness of not more than 20 µm, for example, about 0.5 to 20 µm, preferably about 0.8 to 15 µm, and more preferably about 1 to 10 µm. A surface-smooth layer having too large a thickness has a low flexibility and a poor writing smoothness in pen input and curls up with curing shrinkage.

[Characteristics of Transparent Laminated Film]

The transparent laminated film of the present invention has excellent optical characteristics such as transparency. The transparent laminated film has a total light transmittance at a thickness of 100 µM of about 70 to 100%, preferably about 80 to 100%, more preferably about 85 to 100% (e.g., about 85 to 98%), and particularly about 90 to 100% (e.g., about 90 to 950), in accordance with Japanese Industrial Standards (JIS) K7361.

The transparent laminated film of the present invention has a reduced external haze due to a smooth surface thereof. Thus, the transparent laminated film of the present invention has, for example, a haze at a thickness of 100 µm in accordance with JIS K7136 of about 0.05 to 5%, preferably about 0.1 to 3% (e.g., about 0.15 to 2%), and more preferably about 0.2 to 1.5% (particularly about 0.3 to 1%). According to the present invention, the transparent laminated film, which has a reduced haze, is suitable for a high-definition display.

The transparent laminated film may be used in combination with other functional layers, for example, a transparent conductive layer, an anti-Newton-ring layer, an anti-glare layer, a light-scattering layer, an anti-reflection layer, a polarizing layer, and an optical retardation layer (or a phase layer).

The transparent laminated film of the present invention may be disposed on the outermost side of a display (or a display screen). The transparent laminated film enables smooth input (writing) similar to writing on paper with a ballpoint pen. Thus the transparent laminated film is usable for a pen-input device such as a pen-input touch screen display or a pen tablet, where the film is disposed on the outermost side of a display screen of the device. In particular, the transparent laminated film of the present invention, which has excellent transparency and writing smoothness, is suitable for operation of displays of various pen-input touch screen displays (in particular, a projected capacitive touch screen display of ITO grid system), particularly, a high-resolution television having a 4K display provided with a touch screen, or a high-resolution pen-input device that is used in the architectural field or the medical field.

The pen (contactor) for the pen-input device is made of a hard material (such as a plastic or a metal), and is usually made of a plastic. In light of strength or durability, the plastic may include, for example, a polyacetal resin, an aromatic polyester resin, a polyamide resin, a polycarbonate resin, a poly(phenylene ether) resin, a poly(phenylene sulfide) resin, and a polysulfone-series resin. These resins may be used alone or in combination. Among them, a preferred one includes a polyacetal resin (such as a polyoxymethylene) from the viewpoint of lightness in weight, high strength, excellent durability (such as abrasion resistance) or sliding property. The shape of the pen tip is not limited. The pen tip usually has a curved surface (a rounded shape). The average diameter of the pen tip is not limited. The average diameter of the pen tip can be selected from the range of, for example, about 0.1 to 10 mm and is preferably about 0.3 to 8 mm, more preferably about 0.3 to 5 mm, and usually about 0.5 to 3 mm (particularly about 0.6 to 2 mm).

[Process for Producing Transparent Laminated Film]

The transparent laminated film of the present invention can be produced by a commonly used process that is not limited to particular processes. For example, the transparent laminated film can be produced through a step of coating a transparent substrate layer with a curable composition for forming a surface-smooth layer and a step of curing the curable composition.

In the coating step, the method of applying (or coating) may include a conventional method, for example, a roll coater, an air knife coater, a blade coater, a rod coater, a reverse coater, a bar coater, a comma coater, a dip and squeeze coater, a die coater, a gravure coater, a microgravure coater, a silkscreen coater, a dipping method, a spraying method, and a spinner method. Among these methods, a bar coater or a gravure coater is practically used. If necessary, the curable composition may be applied a plurality of times.

In light of coatability and others, it is preferred that the curable composition forming the surface-smooth layer contain a solvent. The solvent can be selected according to the species and solubility of the urethane (meth)acrylate or others. It is sufficient that at least a solid content can be uniformly dissolved in the solvent. The solvent may include, for example, a ketone, an ether, a hydrocarbon, an ester, water, an alcohol, a cellosolve, a sulfoxide, and an amide. These solvents may be used alone or in combination. The solvent may be a mixed solvent. Among these solvents, a practically used one includes an alcohol (such as isopropanol) and an aromatic hydrocarbon (such as toluene). The curable composition has a solid content of, for example, about 1 to 90% by weight, preferably about 10 to 80% by weight, and more preferably about 30 to 70% by weight.

In a case where the coated curable composition contains the solvent, the curable composition may optionally be dried to remove the solvent. The solvent may be removed by natural drying or by heat drying. The heating temperature may be about 40 to 150° C., preferably about 50 to 120° C., and more preferably about 60 to 100° C.

In the curing step, the curable composition may be cured by heating according to the species of the polymerization initiator, and can usually be cured by irradiation with an active energy ray (or actinic ray). As the active energy ray, for example, there may be used a radioactive ray (such as gamma ray or X-ray), an ultraviolet ray, a visible ray, and an electron beam (EB). The active energy ray is usually an ultraviolet ray or an electron beam in practical cases.

For the ultraviolet ray, the light source may include, for example, a Deep UV lamp, a low-pressure mercury lamp, a high-pressure mercury lamp, a superhigh-pressure mercury lamp, a halogen lamp, and a laser light source (a light source, such as a helium-cadmium laser or an excimer laser). The quantity of the irradiation light (irradiation energy) varies depending on the thickness of the coating. The quantity of the irradiation light may for example be about 50 to 10000 $mJ/cm^2$, preferably about 70 to 7000 $mJ/cm^2$, and more preferably about 100 to 5000 $mJ/cm^2$.

For the electron beam, an exposure source (e.g., an electron beam irradiation apparatus) can be used for the electron beam irradiation. The radiation dose (dose) varies depending on the thickness of the coating. The radiation dose is, for example, about 1 to 200 kGy (kilogray), preferably about 5 to 150 kGy, and more preferably about 10 to 100 kGy (particularly about 20 to 80 kGy). The acceleration voltage is, for example, about 10 to 1000 kV, preferably about 50 to 500 kV, and more preferably about 100 to 300 kV.

The irradiation with the active energy ray may optionally be conducted in an atmosphere of an inactive gas (for example, nitrogen gas, argon gas, and helium gas).

In order to improve the adhesion of the surface-smooth layer to the transparent substrate layer, the transparent substrate layer may be subjected to a surface treatment. The surface treatment may include a conventional surface treatment, for example, a corona discharge treatment, a flame treatment, a plasma treatment, and an ozone or ultraviolet ray irradiation treatment. The surface of the transparent substrate layer may be subjected to an easy-adhesion treatment.

EXAMPLES

The following examples are intended to describe this invention in further detail and should by no means be interpreted as defining the scope of the invention. The transparent laminated films obtained in Examples and Comparative Examples were evaluated for the following items.

[Center Line Average Roughness Ra]

The center line average roughness Ra was measured using a non-contact surface cross-sectional texture measuring system ("R3300GL-Lite-AC" manufactured by Ryoka Systems Inc.).

[Haze and Total Light Transmittance]

Using a haze meter (trade name "NDH-5000W" manufactured by Nippon Denshoku Industries Co., Ltd.), the total light transmittance was measured in accordance with JIS K7361 and the haze was measured in accordance with JIS K7136. The transparent laminated film was disposed so as to face the surface-smooth layer toward a beam receiver, and the measurement of the haze was carried out.

[Abrasion Resistance]

Using a durability tester provided with a stick 1.0 cm in diameter covered with a #0000 steel wool, the steel wool was allowed to go back and forth on the surface of the surface-smooth layer 10 times (at velocity: 10 cm/s) under a constant load of 100 g. Then the transparent laminated film was attached to a black acrylic plate with an optical agglutinant. The state of the surface was observed under the light of a fluorescent tube provided with a three-band fluorescent lamp, and the number of scratches was counted. The abrasion resistance was evaluated on the basis of the following criteria.

A: No scratches appear.
B: One or two scratches appear.
C: Three or more scratches appear.

[Friction Coefficient]

The frictional force was measured under the measurement conditions (load: 200 gf, speed: 100 mm/sec.) using a static and dynamic friction measuring machine ("Handy Tribomaster TL201Ts" manufactured by Trinity-Lab Inc.). A pen made of a polyoxymethylene (pen-tip diameter φ0.8 mm) was used as a contactor. The pen was allowed to slide at an angle of 45° to the film. As reference examples, each of ballpoint pens ("JETSTREAM 0.7 mm" manufactured by Mitsubishi Pencil Co., Ltd. and "Roily 0.7 mm" manufactured by PENTEL CO., LTD.) was allowed to slide on a paper ("Copy paper standard type" manufactured by Kaunet Co., Ltd.). The coefficient of static friction and the coefficient of dynamic friction when the effective measurement distance was set to 50 mm were measured.

[Writing Smoothness]

The transparent laminated film was evaluated for writing smoothness with a digital pen for Nintendo DS® on the basis of the following criteria.

(Scratchy Feeling)
A: The pen scratches a little.
B: The pen scratches a lot at the beginning of pen-input operation.

(Writing Resistance)
A: Smooth resistance
B: Weak resistance or strong resistance (Comfortable Writing)
A: Similar to writing smoothness on paper with a ballpoint pen
B: Different from writing smoothness on paper with a ballpoint pen

[Materials]

Transparent PET substrate film: "A4300" manufactured by Toyobo Co., Ltd., thickness: 100 μm
Urethane acrylate A: "EBECRYL8465" manufactured by Daicel-Allnex Ltd.
Urethane acrylate B: "PU3420" manufactured by Miwon Specialty Chemical Co., Ltd., molecular weight: 2500
Crosslinked cyclic difunctional acrylate: tricyclodecane diacrylate, "IRR214-K" manufactured by Daicel-Allnex Ltd.
Trifunctional acrylate: pentaerythritol triacrylate, "PETRA" manufactured by Daicel-Allnex Ltd.
Initiator A: photopolymerization initiator, "IRGACURE 184" manufactured by BASF Japan Ltd.
Initiator B: photopolymerization initiator, "IRGACURE 907" manufactured by BASF Japan Ltd.
Silicone-series leveling agent: "EBECRYL1360" manufactured by Daicel-Allnex Ltd.
Fluorine-containing leveling agent: "MEGAFACE F-556" manufactured by DIC Corporation Examples 1 to 5 and Comparative Examples 1 to 3

For each example, curable monomers and a leveling agent were provided at a proportion as shown in Table 1, and 4 parts by weight of the initiator A and 2 parts by weight of the initiator B relative to 100 parts by weight of the total amount of the curable monomers were added thereto. A mixed solvent of methylethylketone, 1-methoxy-2-propanol and 1-butanol as a solvent [methylethylketone/1-methoxy-2-propanol/1-butanol =6/3/1 (weight ratio)] was added to the resulting mixture to prepare a liquid composition (curable composition) having a solid content to 50% by weight.

The resulting liquid composition was cast on a transparent PET substrate film with the use of a wire bar #48 and then allowed to stand for one minute in an oven at 80° C. Thereafter, the coated film passed through an ultraviolet irradiation equipment (manufactured by Ushio Inc., a high-pressure mercury lamp, dose of ultraviolet ray: 500 mJ/cm$^2$) for ultraviolet curing treatment to form a surface-smooth layer (dry thickness: 35 μm).

The center line average roughness Ra of the film obtained in Example 1 measured 0.5 nm.

Table 1 shows the evaluation results of the transparent laminated films obtained in Examples and Comparative Examples. Incidentally, Table 1 also shows the coefficients of friction between the paper and "JETSTREAM 0.7 mm" manufactured by Mitsubishi Pencil Co., Ltd. as Reference Example 1 and those between the paper and "Roily 0.7 mm" manufactured by PENTEL CO., LTD. as Reference Example 2.

TABLE 1

|  |  | Examples | | | | | Comparative Examples | | | Reference Examples | |
| --- | --- | --- | --- | --- | --- | --- | --- | --- | --- | --- | --- |
|  |  | 1 | 2 | 3 | 4 | 5 | 1 | 2 | 3 | 1 | 2 |
| Composition (parts by weight) | Urethane acrylate A | 90 | 90 | 90 | 90 | — | 90 | 90 | 100 | — | — |
|  | Urethane acrylate B | — | — | — | — | 100 | — | — | — | — | — |
|  | Crosslinked cyclic difunctional acrylate | 10 | 10 | 10 | — | — | 10 | 10 | — | — | — |
|  | Trifunctional acrylate | — | — | — | 10 | — | — | — | — | — | — |
|  | Silicone-series leveling agent | 1.5 | 1 | — | 1 | 1 | 0.2 | — | — | — | — |
|  | Fluorine-containing leveling agent | — | — | 1 | — | — | — | — | — | — | — |
|  | Total light transmittance (%) | 91.2 | 91.1 | 91.3 | 91.0 | 90.8 | 90.7 | 91.2 | 91.3 | — | — |

TABLE 1-continued

|  | Examples | | | | | Comparative Examples | | | Reference Examples | |
| --- | --- | --- | --- | --- | --- | --- | --- | --- | --- | --- |
|  | 1 | 2 | 3 | 4 | 5 | 1 | 2 | 3 | 1 | 2 |
| Haze (%) | 0.81 | 0.77 | 0.93 | 0.56 | 0.43 | 0.74 | 0.48 | 0.66 | — | — |
| Abrasion resistance | A | A | A | A | C | A | A | C | — | — |
| Coefficient of static friction (μs) | 0.305 | 0.306 | 0.317 | 0.230 | 0.326 | 0.412 | 0.568 | 0.660 | 0.288 | 0.336 |
| Coefficient of dynamic friction (μk) | 0.207 | 0.215 | 0.228 | 0.156 | 0.178 | 0.225 | 0.331 | 0.421 | 0.102 | 0.149 |
| μs − μk | 0.098 | 0.091 | 0.089 | 0.074 | 0.148 | 0.187 | 0.237 | 0.239 | 0.186 | 0.187 |
| Scratchy feeling | A | A | A | A | A | B | B | B | — | — |
| Writing resistance | A | A | A | A | A | A | B | A | — | — |
| Comfortable writing | A | A | A | A | A | B | B | B | — | — |

As apparent from the results shown in Table 1, the transparent laminated films obtained in Examples had writing smoothness similar to that on paper with a ballpoint pen. In contrast, the transparent laminated films obtained in Comparative Examples failed to have writing smoothness similar to that on paper with a ballpoint pen. Further, the transparent laminated films obtained in Examples 1 to 4 had excellent transparency and abrasion resistance.

INDUSTRIAL APPLICABILITY

The transparent laminated film of the present invention is utilizable for a pen-input touch screen (in particular, a projected capacitive touch screen of ITO grid system), a computer pointing device (such as a pen tablet), or other devices. The pen-input touch screen display has a pen-input touch screen in combination with a display (e.g., a liquid crystal display, a plasma display, and an organic or inorganic EL display) in a display unit of a variety of apparatuses (for example, an electric or electronic equipment or precision equipment, such as a PC, a television, a mobile phone or a smartphone, an electronic paper, a game console, a mobile device, a clock or a watch, or an electronic calculator).

In particular, the transparent laminated film, which allows smooth writing (or input) with a plastic pen like writing on a paper with a ballpoint pen, is useful for a display of a pen-input touch screen display of a smartphone, a mobile phone, an electronic paper, a tablet PC, a pen tablet, a game console, or a PC. In particular, from the viewpoint of excellent transparency and writing smoothness, the transparent laminated film is suitable for a high-resolution (4K) television having a display provided with a touch screen, or a high-resolution pen-input device that is used in the architectural field or the medical field.

The invention claimed is:

1. A pen input device having a transparent laminated film on a display surface of said pen input device, the film comprising a transparent substrate layer and a surface-smooth layer on one side of the transparent substrate layer,
    wherein the surface-smooth layer comprises a cured product of a curable composition containing a curable resin and a leveling agent, the curable resin comprising a urethane (meth)acrylate and a difunctional (meth)acrylate having a polycyclic aliphatic skeleton and the leveling agent comprises a fluorine-containing leveling agent, a weight ratio of the urethane (meth)acrylate relative to the difunctional (meth)acrylate having the polycyclic aliphatic skeleton being 93/7 to 85/15 as the urethane (meth)acrylate/the difunctional (meth)acrylate having the polycyclic aliphatic skeleton, and a ratio of the leveling agent being 0.7 to 3 parts by weight relative to 100 parts by weight of the curable resin,
    wherein the surface-smooth layer is free from fine particles, the surface-smooth layer has a surface having a center line average roughness Ra of 0.3 to 0.5 nanometers, and the surface-smooth layer has a coefficient of static friction of 0.2 to 0.4, a coefficient of dynamic friction of 0.1 to 0.3, and a difference between the coefficient of static friction and the coefficient of dynamic friction of larger than 0.05, wherein the difference is the coefficient of static friction minus the coefficient of dynamic friction, and
    wherein the surface-smooth layer is disposed on the outermost side of the display.

2. The pen input device according to claim 1, wherein the leveling agent further comprises a silicone-series leveling agent.

3. The pen input device according to claim 1, wherein the transparent laminated film has a haze of 0.05 to 5% and a total light transmittance of 80 to 100%.

4. A process for producing the pen input device recited in claim 1, the process comprising a step of coating the transparent substrate layer with the curable composition and a step of curing the curable composition.

* * * * *